(12) United States Patent
Doleh et al.

(10) Patent No.: US 7,792,096 B2
(45) Date of Patent: Sep. 7, 2010

(54) METHODS, SYSTEMS, AND COMPUTER PROGRAM PRODUCTS FOR DISTRIBUTED RESOURCE ALLOCATION AMONG CLUSTERED MEDIA GATEWAYS IN A COMMUNICATIONS NETWORK

(75) Inventors: Ahmed Doleh, Sachse, TX (US); Daniel Louis Miller, Plano, TX (US); Lewis Robinson, Dallas, TX (US)

(73) Assignee: Genband US LLC, Plano, TX (US)

( * ) Notice: Subject to any disclaimer, the term of this patent is extended or adjusted under 35 U.S.C. 154(b) by 885 days.

(21) Appl. No.: 11/282,943

(22) Filed: Nov. 18, 2005

(65) Prior Publication Data

US 2007/0116018 A1 May 24, 2007

(51) Int. Cl.
*H04L 12/66* (2006.01)
(52) U.S. Cl. .................. 370/352; 709/226; 370/400
(58) Field of Classification Search ............... 370/352, 370/389, 401
See application file for complete search history.

(56) References Cited

U.S. PATENT DOCUMENTS

| 6,876,646 | B1 | 4/2005 | Dore et al. | |
|---|---|---|---|---|
| 6,944,166 | B1* | 9/2005 | Perinpanathan et al. | 370/401 |
| 2004/0010582 | A1* | 1/2004 | Oliver | 709/224 |
| 2004/0101125 | A1* | 5/2004 | Graf et al. | 379/229 |
| 2004/0267897 | A1* | 12/2004 | Hill et al. | 709/217 |
| 2005/0048973 | A1 | 3/2005 | Hou et al. | |
| 2005/0064907 | A1* | 3/2005 | Nealon | 455/560 |
| 2005/0074017 | A1 | 4/2005 | Qian et al. | |
| 2005/0085181 | A1 | 4/2005 | Tao | |
| 2006/0072555 | A1* | 4/2006 | St. Hilaire et al. | 370/352 |

OTHER PUBLICATIONS

Yoo et al. Media Stream Proccessing of VoIP Media Gateway, Sep. 21-24, 2003, Communications, 2003 APCC 2003, The 9th Asia Pacific Conference on.*
Notification of Transmittal of the International Search Report and the Written Opinion of the International Searching Authority, or the Declaration for International Application No. PCT/US06/41065 (Apr. 26, 2007).
"Implementing Media Gateway Control Protocols," RADVision, pp. 1-16 (Jan. 27, 2002).

* cited by examiner

*Primary Examiner*—Ahmad F Matar
*Assistant Examiner*—Jirapon Intavong
(74) *Attorney, Agent, or Firm*—Jenkins, Wilson, Taylor & Hunt, P.A.

(57) ABSTRACT

Disclosed are methods, systems, and computer program products for distributed resource allocation between media gateways (MGs) in a cluster of MGs. According to one method, available resources provided by each MG in a cluster of MGs controlled by a media gateway controller (MGC) are communicated between the MGs in the cluster. At the media gateways, resources required for a call are identified, rules are applied to select resources for the call from the available resources, and the selected resources are allocated to process the call.

39 Claims, 6 Drawing Sheets

METHODS, SYSTEMS, AND COMPUTER PROGRAM PRODUCTS FOR DISTRIBUTED RESOURCE ALLOCATION AMONG CLUSTERED MEDIA GATEWAYS IN A COMMUNICATIONS NETWORK

TECHNICAL FIELD

The subject matter described herein relates to resource selection and allocation in a communications network. More particularly, the subject matter described herein relates to methods, systems, and computer program products for distributed resource allocation among clustered media gateways in a communications network.

BACKGROUND

In traditional telecommunications systems, a single Media Gateway Controller (MGC) typically controls several Media Gateway (MG) nodes. The MGC traditionally has the responsibility of interconnecting inbound terminations to outbound terminations across the MG nodes it controls to process a call. A call may typically consist of a pulse code modulated (PCM) stream of data with voice encoded information included within the PCM stream. The interconnection path may span several MG nodes under control of the MGC. Along this interconnection path each MG node may have different resources (e.g., echo cancellation (EC), voice quality enhancement (VQE), different coder/decoder (CODEC), automatic level control (ALC), automatic level enhancement (ALE), which is used to automatically amplify an outbound stream in the presence of noisy inbound stream, automatic noise reduction (ANR), hybrid echo cancellation (HEC), etc.) that can be used to modify the voice information.

In order to establish a call, the MGC selects resources needed for the call from the various resources available on the various MGs under its control. The MGC must then allocate these resources for the new call. In order for the MGC to select and allocate resources, the MGC must know both the resources of each MG along the path and must also know which resources are currently in use and which are currently available on each MG. This knowledge requires a complex state association to be maintained within the MGC for all of the MGs under its control. This state information may additionally need to be communicated between the MGC and each MG node under its control, thereby requiring additional bandwidth to maintain this state information. Communication of allocated resources may be done during call setup and at other times. Accordingly, extensive communication may be required to maintain this state information and to setup and tear down calls. Additionally, knowledge of MG resources may pose a different problem by requiring an MGC to know low-level hardware information about a given MG. One principle of the MG-MGC architecture was the separation of call control and media control functions. Requiring the MGC to maintain low-level hardware resource information about the MGs it manages violates this principle.

All of the above-mentioned aspects of traditional MGCs create a situation requiring complexity in the operation and design of MGCs. MGCs must manage all aspects of the call setup and teardown. MGCs must maintain extensive state information, not only for the given call, but also for each MG associated with each call.

Accordingly, in light of the complexity of existing approaches, there exists a need for improved methods, systems, and computer program products for distributed resource selection and allocation among clustered media gateways in a communications network.

SUMMARY

According to one aspect, the subject matter described herein comprises methods, systems, and computer program products for distributed resource allocation between media gateways (MGs) in a cluster of MGs. One method includes communicating, between media gateways (MGs) in a cluster of MGs controlled by a media gateway controller (MGC), available resources provided by each of the MGs and at the media gateways: identifying resources required for a call; applying rules to select resources for the call from the available resources; and allocating the selected resources to process the call.

The subject matter described herein providing distributed resource allocation between media gateways (MGs) in a cluster of MGs may be implemented using a computer program product comprising computer executable instructions embodied in a computer readable medium. Exemplary computer readable media suitable for implementing the subject matter described herein include disk memory devices, programmable logic devices, application specific integrated circuits, and downloadable electrical signals. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
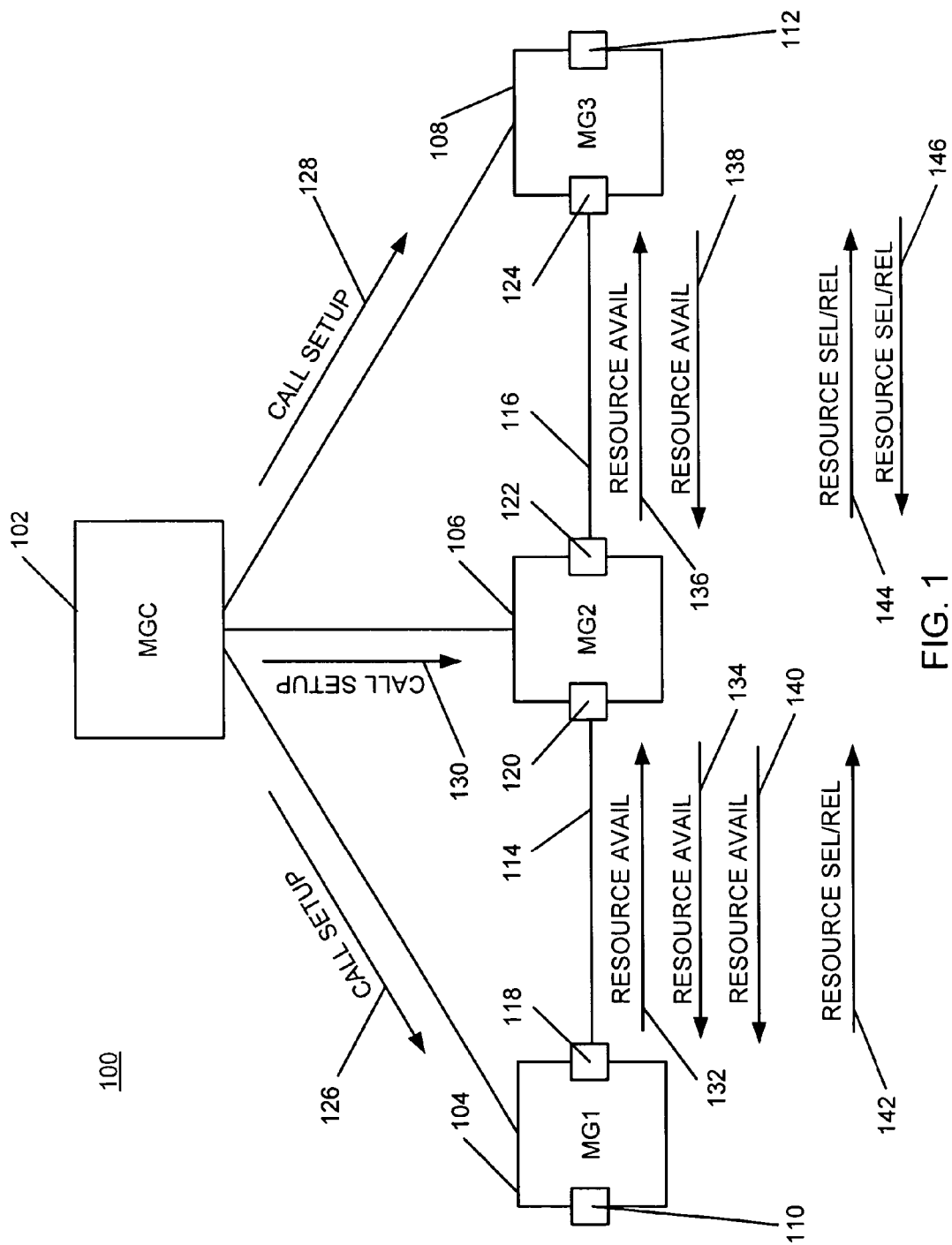
FIG. 1 is block diagram of an exemplary network system showing an exemplary message flow according to an embodiment of the subject matter described herein.

In view of the burdens described above with respect to controlling resource allocation from a media gateway controller, the subject matter described herein distributes this responsibility among media gateways. Where previously a MGC was responsible for configuring all aspects of a call within all of the MGs in the call path, the disclosure herein presents methods, systems, and computer program products for resource allocation among clustered MGs in a communications network. By adapting MG designs to incorporate many of the call resource allocation actions, the burden on a MGC may be reduced. Further, by reducing previous requirements that MGCs intimately know all of the details of every MG under its control, proprietary MGs may be deployed more easily than with previous designs.

Based on the methods, systems, and computer program products described herein, MGCs may perform a more simplified task of initiating call setup and initiating call tear down. As will be discussed, enhancements to MG design described herein may allow resource selection and allocation within a given MG cluster under control of a single MGC to be performed by the MGs themselves.

An understanding of resource selection and allocation may begin with a recognition that different resources may exist on each MG within a given cluster. Examples of resources that may be available on an MG include a variety of speech compression modules, hybrid echo cancellation (HEC) modules, automatic level control (ALC) modules, and automatic noise reduction (ANR) modules. Many other features may also be provided within MGs for use during call processing. These include, for example, voice over IP (VoIP) and coder/decoder (CODEC) conversions. Some CODEC conversion standards are defined by the International Telecommunication Union (ITU) as series G CODEC conversion standards. These series G standards include, for example, G.711, G.723, G.729 and other specifications for CODEC conversion, the details of which shall not be discussed herein for simplicity. Equipment used to implement CODEC conversion standards are occasionally referred to as CODEX equipment.

With the variety of options available for processing a given call, many choices may be made regarding which modules and conversions a given call may undergo. As well, different interfaces on opposite terminating ends of a call may impose conversion requirements along the path of a call to allow communication to be understood by each end user. Other signal processing may be used to improve call quality and provided in the form of resources on MGs. For example, echo cancellation (EC) may be used to minimize echo in voice channels, automatic level control (ALC) may be used to shift the volume of a call up or down, and automatic noise reduction (ANR) may be used to reduce noise and improve call quality.

With the general understanding presented above, approaches for making resource choices at the MG level will now be discussed. For convenience and ease of discussion, certain ports will be named and numbered in the embodiments that follow. While certain ports may be identified in the discussion that follows, any interface or port capable of interconnecting components to facilitate the disclosure herein may be suitable for the given purpose.

FIG. 1 illustrates an exemplary communications network 100 showing an exemplary message flow according to an embodiment of the subject matter described herein. MGC 102 is shown with a cluster of three MGs: MG1 104, MG2 106, and MG3 108, respectively. In this exemplary embodiment, MGC 102 may initiate a call between a first port on MG1 104 and a second port on MG3 108. Details of the call initiation shall be discussed below following the next few paragraphs.

The ports designated as the end points of the call may be port one (P1) 110 on MG1 104 (referred to hereinafter as MG1.P1 110) and port two (P2) 112 on MG3 108 (referred to hereinafter as MG3.P2 112). The path for the call may be established between MG1.P1 110 and MG3.P2 112 through MG1 104, MG2 106, and MG3 108.

For exemplary purposes, the call to be established may be defined by the following endpoint characteristics and details: MG1.P1 110 may be defined with G.723 encoding; and MG3.P2 112 may be defined with hybrid echo cancellation (HEC), automatic level control (ALC), automatic noise reduction (ANR), and G.711 encoding. Likewise, for exemplary purposes, the resources available on the MGs within the cluster may be as follows. MG1 104 may be equipped with no resources of its own. MG2 106 may be equipped with voice quality enhancement (VQE) and CODEC resources, such as: EC (or HEC), ALC, ANR, and CODEX_723. MG3 108 may be equipped with VQE and CODEC resources, such as: EC (or HEC), ALC, ANR, CODEX_AMR, CODEX_723, and CODEX_729. These resources may be directionally associated so that certain resources may be available in one direction only as will be discussed in more detail below.

In order to establish this call and path between MG1.P1 110 and MG3.P2 112, individual links between the MGs may be established. MG interconnection trunks may be used to establish these links. For ease of reference, the trunk between MG1 104 and MG2 106 shall be represented as trunk Tr(3,10) 114 (e.g., provisioned for port 10 of trunk group 3) and the trunk between MG2 106 and MG3 108 shall be represented as trunk Tr(17,20) 116 (e.g., provisioned for port 20 of trunk group 17). The ports connecting these trunks to the MGs may be referred to as inter-trunk ports.

Trunk Tr(3,10) 114 may connect to MG1 104 and MG2 106 at inter-trunk ports MG1.Tr(3,10) 118 and MG2.Tr(3,10) 120, respectively. Likewise, trunk Tr(17,20) 116 may connect to MG2 106 and MG3 108 at inter-trunk ports MG2.Tr(17,20) 122 and MG3.Tr(17,20) 124, respectively.

With the above-referenced elements of FIG. 1 and the individual links to be used for the call identified, a call initiation may now be discussed. Using the above-referenced port identifiers, three call contexts may be defined for the call and communicated by MGC 102 to the MGs within the cluster. The call contexts may be defined and communicated to the MGs in an order different from the order of MGs in the cluster in order to allow this exemplary embodiment to explore some of the asynchronous elements of call setup in more detail.

Call context one (C1) may be defined for and communicated to MG1 104 via call setup message 126. Call context C1 may be defined as follows: a pair of port identifiers referencing a connection from MG1.P1 110 to MG1.Tr(3,10) 118 with a conversion characteristic of G.723 encoding for MG1.P1 110 as described above. Call context C2 may be defined for and communicated to MG3 108 via call setup message 128. Context C2 may be defined as follows: a pair of port identifiers referencing a connection from MG3.Tr(17, 20)) 124 to MG3.P2 112 with conversion characteristics of hybrid echo cancellation (HEC), automatic level control (ALC), automatic noise reduction (ANR), and G.711 encoding for MG3.P2 112. Finally, call context C3 may be defined for and communicated to MG2 106 via call setup message 130 as follows: a pair of port identifiers referencing a connection from MG2.Tr(3,10) 120 to MG2.Tr(17,20) 122 without conversion characteristics defined.

It should be noted that this asynchronous transmission of messages to the MGs within the cluster may be managed and resolved by the individual MGs collectively under this embodiment of the present disclosure. This asynchronous messaging resolution may now be discussed below. Also noteworthy is that MGC 102 now initiates call setup by sending call setup messages, as defined above, and that the call setup management responsibility may now be handled by the cluster of MGs rather than by MGC 102. As will be discussed in more detail below, these asynchronous messages may arrive at different times and in a different order at the MGs.

With asynchronous call setup messages 126, 128 and 130 in route, the call setup and asynchronous message resolution of MG1 104, MG2 106 and MG3 108 may be discussed. But first, in order to better understand the call setup and asynchronous message resolution of the cluster of MGs, it may be helpful to discuss some identifiers and internal data structures that the MGs may use.

Regarding identifiers, specific chips may be identified within each MG to partition the various data manipulation capabilities provided by each MG. The purpose for identifying the specific chips should become apparent as the discussion of the present embodiment progresses. The following device identifiers may be used for the MG data processing capabilities identified above. MG1 104 was described above as not being equipped with any resources for this exemplary embodiment. Therefore, there will be no chip identifier associated with any devices on MG1 104. MG2 106 was described above as being equipped with voice quality enhancement (VQE) and CODEC resources. For purposes of example, the present embodiment may define that EC (or HEC), ALC, and ANR devices may be provided by a single digital signal processor (DSP) chip (Chip1) on MG2 106. It may further be considered that the HEC function is a bidirectional resource available on MG2 106 while the others are unidirectional. The embodiment may also define that the CODEX_723 functionality be provided by a second chip (Chip 2) on MG2 106. Following this resource partitioning for MG3 108, the present embodiment may define that the EC (or HEC), ALC, ANR CODEX_AMR, and CODEX_723 be provided by a single chip (Chip 1), and that the CODEX_729 be provided by a second chip (Chip 2).

In the discussion of the present embodiment below, there will be various messages and data structures discussed. The above-referenced chip numbers may be used within those messages and data structures by the MGs within the cluster to provide information on resource availability and to select resources for call processing. The usage of the chip identifiers may generally be as follows: any reference to a resource by an MG node may be indicated by a chip designator in parentheses next to the resource name (e.g., a reference to CODEX_729 on chip 2 of MG3 108 may be identified with an identifier CODEX_729(2) in a data structure residing on, or in a message communicated by, MG3 108).

For purposes of this discussion, the exemplary communication path to be discussed may be considered bidirectional is nature for simplicity. Uni-directional and multi-directional (e.g., a broadcast communication path set, and a multiplexed/demultiplexed communication environment) are also possible under the present disclosure.

Any given MG may have upstream MGs, downstream MGs, or both associated with it to help process a call in either direction. In order to better understand the directional nature discussed herein, it should be noted that a call is bidirectional and has two physical paths. In FIG. 1, for example, the two paths are: 1) a path from MG1.P1 110 to MG3.P2 112, and 2) another physically independent path from MG2.P2 112 to MG1.P1 110. Accordingly, for the first path (1), the downstream direction is from MG1.P1 110 to MG3.P2 112 and the upstream path is from MG3.P2 112 to MG1.P1 110. Similarly, for the second path (2), the downstream direction is from MG3.P2 112 to MG1.P1 110 and the upstream path is from MG1.P1 110 to MG3.P2 112. Every MG port that is associated with a call has access to both physical paths (1) and (2).

Each MG port has an egress path and an ingress path that are directionally aligned to one of the bidirectional physical paths. An ingress path and egress path alignment pair may be either: path one (1) and path two (2) in that order, or path two (2) and path one (1) in that order. In either case, the egress direction is aligned to the downstream direction of path one (1) or path two (2), and the ingress direction is aligned to the upstream direction of path two (2) or path one (1). Accordingly, the egress direction shall be referred to herein as the downstream direction and the ingress direction shall be referred to as the upstream direction. Further, within this disclosure, the references "upstream" and "downstream" will be used for both path one (1) and path two (2) without distinguishing the bidirectional physical path.

Regarding usage of this syntax, a local MG resource device may modify downstream traffic and may have its upstream traffic modified by another MG. An MG that receives modified traffic will always consider the resources that modified the traffic to be upstream (or external). Accordingly, upstream resources are external and may modify upstream (incoming) traffic and local resources may modify downstream (outgoing) traffic.

For purposes of this discussion, resources available for call processing on a given MG may be considered directional in nature as discussed above. Accordingly, a resource that may be offered to a downstream node, and thereby temporarily reserved for call processing, may be considered a separate resource from other resources offered to other downstream MGs for processing the current or another call in either call direction.

Resource availability may typically be communicated to nodes that are downstream in the call processing path and resource selection and allocation may typically be communicated to upstream nodes. As will be discussed in more detail below and for ease of discussion, messaging may be considered to flow downstream with logical resolution to an upstream call path within a given MG based upon a message type identifier.

When downstream nodes communicate with nodes further down stream, the resources of upstream nodes may be added to the list of local resources communicated to downstream nodes during a resource availability phase. Once identified as available, these added resources may be selected by downstream nodes during a resource selection phase. In this way, the device identifier (e.g., chip index) discussed above may be used to facilitate identification of a specific resource in a specific chip on a specific MG, as will be discussed in more detail below. For example, if MG2 106 was to communicate with MG1 104 to identify locally available resources along with the availability of upstream CODEX_729(2) on MG3 108, MG2 106 may distinguish CODEX_729(2) on MG3 108 by incrementing the chip index and referencing it as CODEX_729(3). Note that in the present embodiment, MGC 106 has only two chips defined, so identifier (3) is available for use.

Prior to discussing data structures and messages in more detail, it should be noted that data types for fields within data structures or messages discussed herein may be any useful data type or storage medium capable of representing the identified information. There should be no specific syntax implied by the following representations. A generic syntax shall be used herein for ease of description and discussion. Further, the term instantiation may be used herein to describe a creation or resetting/clearing of a usable data structure, while the term descriptor may be used to reference data structure type definitions, contents and organization. An instantiated data structure includes any dynamically or statically created structure as well as other types of data structures capable of associating data for the particular purpose. The term descriptor includes any form capable of identifying useable data fields.

Clustered resource allocation method (CRAM) may be used as a reference designator or acronym herein to designate information associated with the present embodiment. This acronym is for convenience and may be used by any and all embodiments of the many methods, systems, and computer program products for distributed resource selection and allocation among clustered media gateways in a communications network based upon this disclosure.

Turning now to data structures, the following may be helpful to understand the present embodiment. A CRAM path descriptor (CPD) data structure may be associated with each MG-interconnection (e.g., an inter-trunk port) within each MG in a call path. A CPD data structure may hold an identifier for each MG-interconnection port. Accordingly, one port may be identified within a CPD on each terminating MG and two may be identified within a CPD for each MG other than a terminating MG in the call path. An exemplary CPD definition may look like the following data structure descriptor. When instantiated, CPD data structures may be indexed and placed within arrays or other suitable data structures for reference.

```
CRAM_PATH_DESCRIPTOR {
    Connection_ID Field;
    InterTrunk_Port_List [Number_of_Ports] Field
        {Port_Identifier Field; CPRD_Index Field} ;
}
```

Within an instantiation of a CPD, the Connection_ID field may be used to identify a call path within the MG that instantiates the CPD. This path may associate one or two ports with the call path as discussed above. The InterTrunk_Port_List may store identifiers for the inter-trunk ports associated with a call in the Port_Identifier field. The port identifiers within the InterTrunk_Port_List may reference other data structures as discussed in more detail below in the CPRD_Index field. The Number_of_Ports may indicate how many port identifiers may be referenced within the CPD. When referenced, a CPD_index may be used to identify a specific instantiation of the CPD within a collection of CPDs.

A CRAM port resource descriptor (CPRD) data structure may be associated with each MG-interconnection port within each MG in a call path. Accordingly, one may be instantiated for each terminating MG and two may be instantiated for each MG other than a terminating MG in the call path. Accordingly, there may be one CPRD for each inter-trunk port associated with a CPD on an MG. An exemplary CPRD definition may look like the following data structure descriptor. CPRDs may be indexed when instantiated and placed within arrays or other suitable data structures for reference. CPRDs may also be referenced within a CPD by an array-index number as discussed above in relation to the CPRD_Index Field.

```
CRAM_PATH_RESOURCE_DESCRIPTOR {
    CPD_Index Field;
    Port_Identifier Field;
    Upstream_Coding Field;
    Downstream_Coding Field;
    Term_Reached Field;
    Upstream_Resource Field;
    Local_Resource Field;
}
```

Within an instantiation of a CPRD, the CPD_Index field may be used to identify an instantiated CPD associated with this CPRD instantiation within an array or other collection of CPDs. The Port_Identifier field may be used to identify the inter-trunk port within the MG that is associated with this CPRD. The Upstream_Coding field may be used to identify the encoding of the information sent out on the referenced inter-trunk port. The Downstream_Coding field may be used to identify the encoding of the information received on the referenced inter-trunk port. The Term_Reached field may be used to indicate a boolean condition of true when a call path has been identified at least as far as the upstream end point and available resources for the call path have been shared by all upstream MGs within the call path. In this way, resource availability may be communicated downstream to the outbound termination and a completed resource availability cycle for a call path may be identified at a terminating MG node as will be discussed in more detail below. The Upstream_Resource field may be used to identify resources that are available for call processing in upstream MGs. The Local_Resource field may be used to identify local resources that are either being reserved for the call or that have been allocated for the call. Details of these fields will be discussed in more detail below.

A path search descriptor (PSD) may be used to identify inter-trunk ports within each MG in the form of a path search table (PST). A PST may be used to associate port identifiers with CPD indexes. An exemplary PSD definition may look like the following data structure descriptor.

```
PATH_SEARCH_DESCRIPTOR {
    List_of_Ports[Number_of_Ports] Field
        { Port_Identifier Field; CPD_Index Field};
}
```

Within an instantiation of a PSD to form a PST, an index or port identifier may be used to access a reference to a port within an MG. The List_of_Ports field may include a list of all inter-trunk ports within the MG and sized according to a Number_of_Ports field representing the number of ports on the MG. The List_of_Ports may be indexed by a port reference and may also include an CPD_Index to reference a CPD instantiation associated with each port listed.

By using an organization of information as discussed above, an exemplary embodiment of the disclosure herein may associate a port within an MG with a CPD instantiation using a PST instantiation. As discussed above, a CPD instantiation may associate call contexts and CPRD instantiations with the ports. Further, CPRD instantiations may associate resource and encoding information with a call. Accordingly, information for a call may be obtained by reference initially to a port.

Turning now to a discussion of message structures, several message class types may be defined for use by the MGs for inter-MG communication. Three message class types will be discussed in detail below, though it should be noted that many other possibilities exist. Some examples of other message class types are class types to manage resources for echo cancellation, to manage resources for voice enhancement (which includes ANR, ALC, and ALE), to manage resource for packet voice tunneling which include transaction free operation (TFO) and transcoder free operation (TrFO) through the cluster nodes, to manage resources for CODEC negotiation conversion and setup within a cluster, to manage resources for music-on-hold broadcasting within a cluster, and to manage resources for cellular text modem/teletype (CTM/TTY) insertion, among others. TTYs may include teletype machines, text telephones, and telecommunication devices for the deaf (TDD). Any other available resource may be managed by the disclosure herein.

The first message class type to be discussed in detail may be defined as a link control message. This class of messages may be used to control the communication channels. These messages may be given a high processing priority. Examples of link control constructs include link restarts, acknowledgements, negative acknowledgements, link shutdowns, link status reports, link performance data, and others.

A second message class type may be defined as a resource control message. This class of messages may be partitioned into two types (or constructs): resource available (or resource offer) and resource request (or resource select). Both of these resource control messages will be discussed in more detail below. These messages may include a reference to a path identifier (PathID), such as trunk circuit ID, common connection ID, inter-trunk port or any other reference suitable for identifying a call path. This PathID may be understood by the two MG nodes bounding this link to refer to the identified link/path. The PathID may be used to associate resource requests and resource availability with a certain voice/data path and call context, and may be port references as discussed above in the discussion of data structure descriptors.

A third message class type may be defined as a connection control message. This class of messages may be used to control resource setup, restart and tear down between the MG nodes on a given path. These control messages may also be used when a path has been altered in some way that affects the resources allocated by other MGs along the path. For example, a treatment (e.g., a transcoder or other type of conversion) may have been inserted into a TrFO (Transcoder Free Operation) path thereby indicating that TrFO may no longer be maintained and that a conversion device is now in the call path.

Specific message descriptors, as described above for data structures, will not be discussed herein in detail for the message types. It is believed that one skilled in the art may be able to create appropriate message descriptors based upon the disclosure herein in relation to the messages discussed below and the descriptors discussed above. Accordingly, the discussion may now return to the exemplary embodiment of FIG. 1.

FIG. 1 was discussed most recently in relation to the asynchronous call setup messages. Asynchronous call setup messages 126, 128 and 130 were sent to MG1 104, MG3 108 and MG2 106, respectively. As discussed above, the call setup messages may each convey a call context to the MG that receives the message. Please refer to the call context discussed above for more information on the specific contexts to be used in this exemplary embodiment.

As discussed above, the call setup messages may be received by the MGs within the cluster at different times. To further develop this exemplary embodiment, the following message sequence may now be discussed. In this example, it is assumed that MG1 104 receives call setup message 126 first, MG3 108 receives call setup message 128 second, and that MG2 106 receives call setup message 130 last. Subsequent events may be discussed asynchronously in an order that should allow several aspects of the present embodiment to be represented.

Upon receipt of call setup message 126, MG1 104 may inspect the message and determine the connection requested based upon the call context, C1, associated with this message. Recall that C1 depicts a connection between two ports on MG1 104: MG1.P1 110, which may be considered a terminating port, and MG1.Tr(3,10) 118, which may be considered an inter-trunk port connecting MG1 104 to MG2 106. Terminating ports may be considered within this context to be ports that are connection end points, inter-trunk ports that do not support cluster resource allocation processes, or ports that are inter-MGC trunks (which are selected by both MGCs controlling the inter-MGC trunks). Inter-trunk ports may be allocated independently by an MGC for each call. Accordingly, MG1 104 may search for information related to MG1.Tr(3,10) 118 without further processing to allocate MG1.P1 110. MG1 104 may index into a PST, discussed above with a Port_Index (in this example, the index may be any index capable of locating information for port MG1.Tr(3,10) within the PST), to attempt to find an CPD identifier associated with the port. Recall that a CPD may be used in order to determine whether trunk port MG1.Tr(3,10) 118 has a CPRD associated with it. For simplicity, this discussion may consider that initially there is not a CPD associated with call context C1 and that there either is not a CPRD associated with trunk port MG1.Tr(3,10) 118 or that a CPRD that is present is associated with an older call.

MG1 104 may associate the call context and ports with a CPD, either by populating or instantiating a CPD, for the call context with a Connection_ID set to a value representative of the present call context C1 (e.g., "C1"). MG1 104 may populate the InterTrunk_Port_List with an identifier associated with MG1.Tr(3,10) 118 (e.g., "Tr(3,10)"). For MG1 104, the Number_of_Ports field may be set to one ("1") and only one port placed in the port list. Alternatively, the InterTrunk_Port_List may also be populated with an identifier for the normal port MG1.P1 110 and the Number_of_Ports field set to two ("2"). Any other manner of associating the normal port with the call context may also be used. For simplicity, the discussion may proceed by considering that the normal port identifier is associated with the call context within a PST rather than in a CPD.

MG1 104 may then associate the inter-trunk port (ports for non-terminating MGs) with a CPRD, either by instantiating or resetting/clearing an existing CPRD. MG1 104 may then fill in the CPD_Index to refer back to the associated CPD, fill in the Port_identifier field to represent MG1.Tr(3,10) 118, fill in the Upstream_Coding field with the traffic type received from the upsteam ports (e.g., in this case MG1.P1 110) and that represents the coding provided by MG1 104 on this link to downstream nodes (e.g., "G723" as defined in call context C1 for P1), fill in the Downstream_Coding to "NONE" indicating that the downstream (received) traffic type is unknown, set the Term_Reached field to an indication of "true," clear the Upstream_Resource list since there are no upstream MG nodes defined yet, and may reserve and fill in any local resources that are available on this MG node for use by any downstream MG nodes (in this case it remains empty because there are no local resources defined for MG1 104). It should be noted that MG1 104 has set the TermReached field to true (or "1") because one of its ports identified for the call has been identified as a normal port. Accordingly, it is a terminating MG node.

The following PST, CPD and CPRD should represent the current state of

```
PathSearchTable {...,'Tr(3,10)'=038, ...};
CPD[038]
{
    Connection_ID = "C1";
    InterTrunk_Port_List [ ] = { "Tr(3,10)"=2033 };
```

-continued

```
}
CPRD[2033]
{
    CPD_Index = 038;
    Port_Identifier = "Tr(3,10)";
    Upstream Coding = G723;
    Downstream Coding = 'NONE'
    TermReached = True;
    UpstreamResource[ ] = { };
    LocalResource[ ] = { };
}
```

With its local data records updated, MG1 104 may then attempt to initiate call setup by sending a message indicating its traffic type and resource capabilities to its neighboring MG2 106. In this case, MG2 106 may be considered a downstream as well as an upstream MG for trunk group 3. For present considerations, downstream aspects of MG2 106 may be considered.

MG1 104 may send resource available message 132 to MG2 106. Resource available message 132 may include information pertaining to the trunk port, termination type and resources available on MG1 104. The following depicts exemplary contents and format of resource available message 132.

```
Class= Resource Control,
Construct= Resource Available
Resource Available
{
    Port_Identifier = "Tr(3,10)";
    Termination_Type= G723        //G.723 upstream termination
    Resources_List
    {
        TermReached = true;
        Resource_Count = 0;        // no resources
    }
}
```

MG1 104 has set the Resources_List in the message to indicate resources available on MG1 104 to process the call. In the present embodiment, there are no local resources for use on MG1 104. Accordingly, MG1 104 may also set Resource_Count to zero ("0"). Note that the message class indicates a resource control message and that the construct is a resource available message construct.

In this example, it is assumed that MG2 106 receives resource available message 132 prior to receiving call setup message 130 identifying context C3 from MGC 102. Accordingly, no path for the call has been defined on MG2 106. Therefore, in response to resource available message 132 MG2 106 may perform a similar process to that performed on MG1 104 upon receipt of call setup message 126. However, in this situation, MG2 106 does not yet know about the entire call context C3 that it is supposed to construct.

MG2 106 may associate the port referenced within resource available message 132 with the call by either instantiating or populating a CPD and may set the Connection_ID to "NOCONTEXT" temporarily and add the port MG2.Tr(3,10) 120 to the Inter_Trunk_Port_List. The inter-trunk port CPRD storage area may be instantiated or cleared and the Upstream_Resource list populated with the resources received in the resource available message 132. MG2 106 may reserve and fill the MG2.Tr(3,10) port CPRD with local resources that can be used by downstream MG nodes (e.g., MG1 104, the downstream node for this trunk port). Recall the previous discussion related to the resources identified as available resources on MG2 106 and identified below in the LocalResource field of the CPRD.

The following PST, CPD and CPRD should represent the current state of this call within MG2 106.

```
PathSearchTable {...,'Tr(3,10)'=0340, ...};
CPD[0340]
{
    Connection_ID = "NOCONTEXT";
    InterTrunk_Port_List [ ] = { "Tr(3,10)"= 1233 };
}
CPRD[1233]
{
    CPD_Index = 0340;
    Port_Identifier = "Tr(3,10)";
    Upstream Coding = "NONE";
    Downstream Coding = G723;
    TermReached = True;
    UpstreamResource[ ] = { };
    LocalResource[ ] = { HEC(1), ALC(1), ANR(1),
        CODEX_G723(2) };
}
```

At the next stage of the exemplary progression we may consider that setup message 130 including call context C3 information arrives at MG2 106. MG2 106 may determine from the previously discussed definition of the CPD and CPRD that includes information related to call context C3 that a previous asynchronous message from a neighboring node related to this call has been received.

MG2 106 may change the existing CPD and CPRD and add a CPRD for the second trunk port associated with the call as follows.

```
PathSearchTable {...,'Tr(3,10)'=0340,
    'Tr(17,20)'=0340...};
CPD[0340]
{
    Connection_ID = "C3";
    InterTrunk_Port_List [ ] =
    { "Tr(3,10)"= 1233,
      "Tr(17,20)"=3345 };
}
CPRD[1233]
{
    CPD_Index = 0340;
    Port_Identifier = "Tr(3,10)";
    Upstream Coding = NONE;
    Downstream Coding = G723;
    TermReached = True;
    UpstreamResource[ ] = { };
    LocalResource[ ] = { HEC(1), ALC(1),
        ANR(1), CODEX_G723(2) };
}
CPRD[3345]
{
    CPD_Index = 0340
    Port_Identifier = "Tr(17,20)"
    Upstream Coding = G723;
    Downstream Coding = NONE        // downstream coding not
                                      yet known
    TermReached = False
    UpstreamResource[ ] = { };
    LocalResources[ ]= { HEC(1) };   // Only one directional
                                      resource
}
```

The Connection_ID field of the CPD has been updated to reflect an actual call context, in this example, C3. As well, information associated with the paired trunk (e.g., "Tr(17, 20)") for call context C3 has been added to the Path- SearchTable and InterTrunk_Port_List of the CPD with indexes. Because call context C3 only establishes a pass through connection, MG2 106 does not have any resource requirements to consider. It should further be noted that only one local resource has been reserved for use by MG3 108. This represents a directional nature of certain resources. In the present exemplary embodiment only HEC(1) may be used to process information flowing from upstream node MG1 104 to downstream node MG3 108.

Because there has not yet been a resource available message received from MG3 108, a new CPRD associated with trunk port "Tr(17,20)" may have its downstream coding set to "NONE" to indicate that no encoding has yet been established and the TermReached field may be set to false. The LocalResources list field may be populated with local resources that may be used by downstream MG3 108, HEC (1) as discussed above.

MG2 106 may then proceed by sending a message a resource available message 134 to its neighboring MG1 104. The message may include reserved local resources for MG1 104 for port MG2.Tr(3,10) 120 in the CPRD and may include upstream resources. Note that at the present stage of development, no upstream resources are yet present due to the fact that there has not yet been a call resource available message received from an upstream MG.

The following depicts exemplary contents and format of resource available message 134.

```
Class= Resource Control,
Construct= Resource Available
Resource Available
{
    Port_Identifier = "Tr(3,10)";
    Termination_Type= NONE;         // Traffic type not defined yet
    Resources_List
    {
        TermReached = False;
        Resource Count = 4;          // available resource count
        Resources_Available_List
        [ ] = {
        HEC(1),                      // local resources available to
                                     MG1 from MG2
        ALC(1),
        ANR(1),
        CODEX_723(2)                 // CODEC device available
        }
    }
}
```

The Termination_Type has been set to "false" because the upstream termination has not yet been determined. As well, the Resource_Count field has been set to four ("4") and the Resources_Available_List populated with the local resources available on MG2 106 for use by MG1 104.

Having already provided available resources to MG1 104, MG2 106 may send a resource available message 136 to MG3 108 indicating available resources for use during the call. The following depicts exemplary contents and format of resource available message 136.

```
Class= Resource Control,
Construct= Resource Available
Resource Available
{
    Port_Identifier = "Tr(17,20)";
    Termination_Type= G723;         // upstream traffic type defined
    Resources_ List
    {
```

```
        TermReached = True;
        Resource Count = 1;          // available resources
        Resources_Available_List
        [ ] = {
        HEC(1)                       // local resources available to
                                     MG3 from MG2
        }
    }
}
```

The Termination_Type refers to the type received from MG1 104 and that the TermReached field has been set to true to reflect that communication has been established along the upstream path with a terminating node (e.g., MG1 104). As discussed above, only one resource, HEC(1) has been offered as a local resource to MG3 108.

One consideration that should be noted at this point is that the asynchronous nature of this protocol may create a situation wherein MG2 106 could receive a resource available message from MG1 104 followed by a resource available message from MG3 108 prior to the receiving call setup message 130 from MGC 102. In such a case, two separate CPD and CPRD constructs may have been created based upon each resource available message. In this situation, a CPD merge operation may be performed upon receipt of call setup message 130. This CPD merge operation may combine the two CPD and CPRD resources into a grouping similar to that discussed above. This merge will not be discussed in detail as it should be apparent, based upon this discussion, what operations may be performed on the data structures in order to merge them into a representation of a call context.

Continuing with the present exemplary message sequence progression, the discussion may consider that MG3 108 receives call setup message 128 prior to receiving resource available message 136. In this situation, actions similar to those performed on MG1 104 and discussed above may be performed on MG3 108.

The following PST, CPD and CPRD should represent the current state of this call within MG3 108 prior to receiving resource available message 136.

```
PathSearchTable {...,'Tr(17,20)'=123, ...};
CPD[123]
{
    Connection_ID = "C2";
    InterTrunk_Port_List [ ] =
    { "Tr(17,20)"= 45 };
}
CPRD[45]
{
    CPD_Index = 123;
    Port_Identifier = "Tr(17,20)";
    Upstream Coding = G711;              //upstream coding defined
    Downstream Coding = NONE;
    TermReached = True;
    UpstreamResource[ ] = { };
    LocalResource[ ]=                    //local resources reserved
                                         for downstream
    {
        HEC(1), ALC(1), ANR(1),
        CODEX_G723(1),
        CODEX_AMR(1),
        CODEX_G729(2)
    }
}
```

Call context C2 defines G.711 encoding for MG3.P2 112. MG3 108 may also be considered a terminating node.

MG3 108 may then send resource available message 138 to MG2 106. The following depicts exemplary contents and format of resource available message 138.

```
Class= Resource Control,
Construct= Resource Available
Resource Available
{
    Port_Identifier = "Tr(17,20)";
    Termination_Type= G711;        // upstream traffic type defined
    Resources_List
    {
        TermReached = True;        // sent from a terminating node
        Resource Count = 6;        // available resource count
        Resources_Available_List
        [ ] = {
        HEC(1),                    //local resources available to
                                   MG2 from MG3
        ALC(1),
        ANR(1),
        CODEX_G723(1),
        CODEX_AMR(1),
        CODEX_723(2)               // CODEC device available
        }
}
```

Prior to considering receipt of resource available message 138 by MG2 106, consideration may be given to the asynchronous receipt of resource available message 136 by MG3 108. MG3 108 may locate the CPD for call context C2 by searching within the PST and locating the CPD associated with "Tr(17,20)" which includes a reference to the CPRD for the call. MG3 108 may then populate the CPRD upstream resource list to contain the resources available from MG2 106. Since there is no other trunk port in the CPD list, MG3 108 knows that it now has all resource information for this call path available to it.

The following PST, CPD and CPRD should represent the current state of this call within MG3 108 after receiving resource available message 136.

```
PathSearchTable
{...,'Tr(17,20)'=123, ...};
CPD[123]
{
    Connection_ID = "C2";
    InterTrunk_Port_List [ ] =
    { "Tr(17,20)"= 45 };
}
CPRD[45]
{
    CPD_Index = 123;
    Port_Identifier = "Tr(17,20)";
    Upstream Coding = G711;
    Downstream Coding = G723;
    TermReached = True;
    UpstreamResource[ ] = {
        HEC(3),                    // upstream resources available to
                                   MG3 from MG2
                                   // with chip index incremented
    };
    LocalResource[ ]=
    {
        HEC(1), ALC(1), ANR(1),
        CODEX_G723(1),
        CODEX_AMR(1),
        CODEX_G729(2)
    }
}
```

The chip index for the chip resident on MG2 106 has been incremented so that they it may be referenced as if they were local chip three (3). The purpose for this should become apparent when exemplary allocation rules are discussed below. For now, it may be recognized that chips with higher indexes may reside closer to the termination of the upstream path.

Before proceeding further with actions on MG3 108, consideration may be given to what happens when MG2 106 receives resource available message 138 from MG3 108. MG2 106 may use an identifier "Tr(17,20)" to locate the CPD associated with the call within its PST. MG2 106 may then compare the message upstream resources to the ones saved in the associated CPRD and the new resources may be added to the CPRD.

As discussed, upon receipt of resource available message 138, MG2 106 may change the existing CPD and CPRD pair for call context C3 as follows.

```
PathSearchTable {...,'Tr(3,10)'=0340,
'Tr(17,20)'=0340...};
CPD[0340]
{
    Connection_ID = "C3";
    InterTrunk_Port_List [ ] =
    { "Tr(3,10)"= 1233,
      "Tr(17,20)"=3345 };
}
CPRD[1233]
{
    CPD_Index = 0340;
    Port_Identifier = "Tr(3,10)";
    Upstream Coding = G711;
    Downstream Coding = G723
    TermReached = True;
    UpstreamResource[ ] = { };
    LocalResource[ ] = { HEC(1),
    ALC(1), ANR(1),
    CODEX_G723(2) };
}
CPRD[3345]
{
    CPD_Index = 0340
    Port_Identifier = "Tr(17,20)"
    Upstream Coding = G723         // set upstream coding to G.723
    Downstream Coding = G711
    TermReached = True             // upstream termination reached
    UpstreamResource[ ] = {
        HEC(3), ALC(3), ANR(3),
        CODEX_G723(3),
        CODEX_AMR(3),
        CODEX_G729(4)              //upstream resource chip
                                   indexes incremented
    };
    LocalResources[ ]= { HEC(1) };
}
```

The Upstream Coding has been set to G711, for trunk port "Tr(3.10)," the Downstream Coding has been set to G711, that the TermReached field has been set to "true" for trunk port "Tr(17,20)," and the chip indexes have been incremented.

Next MG2 106 may check to see if there is another inter-trunk port within this CPD. It should find that trunk port "Tr(3,10)" has been defined. Since the "Tr(17,20)" CPRD upstream resources have been modified for the call context C3, MG2 106 may send an updated resource available message to the downstream port (in this case port "Tr(3,10)").

MG2 106 may send resource available message 140 to MG1 104 populated with upstream resources listed in the CPRD associated with "Tr(17,20)" and the reserved local resource list in the CPRD for "Tr(3,10)." The following depicts exemplary contents and format of resource available message 140.

```
Class= Resource Control,
Construct= Resource Available
Resource Available
{
    Port_Identifier = "Tr(3,10)";
    Termination_Type= G711;        // upstream MG3 traffic type
                                   updated
    Resources_List
    {
        TermReached = True;        // termination has been reached
        Resource Count = 10;       // available resource count
                                   increased
        Resources_Available_List
        [ ] = {
        HEC(1),                    // local resources from MG2
                                   available to MG1
        ALC(1),
        ANR(1),
        CODEX_723(2)
        HEC(3),                    // HEC provided by MG3
        ALC(3),
        ANR(3),
        CODEX_AMR(3),              // CODEC provided by MG3
        CODEX_G723(3),
        CODEX_G729(4)
        }
}
```

The upstream traffic type has been indicated to be G.711 coming from MG3 108 and the chip indexes have been incremented. As well, the TermReached field has now been set to "true."

The following PST, CPD and CPRD should represent the current state of this call within MG1 104 after receipt of resource select message 140.

```
PathSearchTable {...,
'Tr(3,10)'=038, ...};
CPD[038]
{
    Connection_ID = "C1";
    InterTrunk_Port_List [ ] = { "Tr(3,10)"=2033 };
}
CPRD[2033]
{
    CPD_Index = 038;
    Port_Identifier = "Tr(3,10)";
    Upstream Coding = G723;
    Downstream Coding = G711;      // downstream traffic type
                                   updated
    TermReached = True;            // termination now reached
    UpstreamResource[ ] = {
        HEC(1),                    // Provided by MG2
        ALC(1),
        ANR(1),
        CODEX_723(2)
        HEC(3),                    // HEC provided by MG3
        ALC(3),
        ANR(3),
        CODEX_AMR(3),              // CODEC provided by MG3
        CODEX_G723(3),
        CODEX_G729(4)
    };
    LocalResource[ ] = { };
}
```

It should be noted that the downstream (received traffic) encoding has been set to G.711 encoding and that this is not the encoding that MG1 104 may present to MG1.P1 110. It should also be noted that the chip indexes have not been incremented for MG1 104 data structures as was done for other data structures on the other MG nodes. The reasoning may be understood by noting that MG1 104 has no local resources. Accordingly, there has been no need to increment chip indexes to manage identifiers for chips in other devices. All chip identifiers within MG1 104 may be considered to reside on other MGs.

At this point the resources available on both directions of this path are known to all the MG nodes on the path. Now comes the time when decisions may be made as to which resources are to be used on which MG. This decision may be made based upon a number of rules (e.g., criteria). Several selection rules are possible. Example rules may be to minimize the number of converting devices in a call path, to attempt to consolidate the converting devices to one MG if possible, to prefer converting devices closer to a terminating port over converting devices residing further from the terminating port, to have the terminating ports decide which of the available resources are to be used, and to allow a terminating MG to override a prior resource selection made by an inter-connecting MG wherein the inter-connecting MG may have previously selected a locally available resource to modify a pulse code modulated (PCM) stream. Many other rules are possible based upon the present discussion.

In one exemplary embodiment, the rules applied by the media gateways may be implemented in a hierarchical manner as follows:

```
If Incoming upstream traffic type = = downstream traffic type
Then
    Select enhancement devices;
    Minimize the number of enhanced devices; and
    Select the device closest to the termination;
Else // traffic type has to be changed
    Locate possible translation devices;
    Prefer a device that can do the translation in either direction;
    Prefer the all translation be performed in one device if possible;
    Select Traffic enhancement devices upstream from the translation
        device;
    Prefer devices that support all/most of the enhancement; and
    Prefer devices closest to the termination.
```

In the present embodiment, MG1 104 has only one known requirement for the call. That requirement is to interface with G.723 traffic. MG1 104 may make a decision regarding conversion of the incoming upstream G.711 to G.723. Based upon the rules discussed above, it may choose either to do a conversion locally or to choose the closest upstream MG to do the conversion. Because MG1 104 has no local resources (recall that MG1 104 did not need to increment chip indexes as a result), it may look for information in the resource list of the CPRD associated with the call. From this information, MG1 104 knows that MG2 106 and a node closer to the termination, MG3 108, may both provide the conversion. MG1 104 knows this due to the multiple resource representations in the UpstreamResource list for a CODEX_723 converter (e.g., CODEX_723(2) and CODEX_723(3)). In this example, MG1 104 may request that MG3 108 convert the traffic by identifying its CODEX_723 with the highest device number (this may indicate that it is the device closest to the termination point MG3.P2 112).

MG1 104 may make this request by sending a new message construct, resource select message 142, to MG2 106. MG1 104 may then remove all unused resources from the upstream list. Resource select messages are similar in format to resource available messages in that they are sent downstream along the call path. Accordingly, it should be sufficient for purposes of understanding the message formats that follow to note that the message construct indicates "Resource Select" rather than the previous "Resource Available."

However, resource select messages are different from resource available messages in that resource select messages are logically sent to upstream MGs to request a modification of upstream (inbound) traffic. While resource available messages have been sent downstream to pass along available resource information that may also be used by the downstream MGs to modify their upstream (inbound) traffic. For ease of discussion, it may be presumed that message flow and call flow are directionally correlated so that messages may be considered to flow downstream. Therefore, in the following discussion, downstream transmission of resource select messages may be used for consistency of message flow with the recognitions that resource selections within a resource select message refer to upstream resources in a call path and, as such, are logically sent upstream. A resource select message may also serve a dual purpose of releasing reserved upstream resources (e.g., any reserved upstream resources that are not selected may be available for other call processing and thereby released from reservation for the current call).

The resources discussed above in previous paragraphs may provide examples of resources that may be selected with resource select messages. Any other resource type may be selected using a resource select message.

The following depicts exemplary contents and format of resource select message 142.

```
Class= Resource Control,
Construct= Resource Select
Resource Selection
{
    Port_Identifier = "Tr(3,10)";
    Termination_Type= G723;    // MG3 Traffic type changed to
                                  G.723
    Resources_List
    {
        Resource Count = 1;       // selecting one resource
        Resources_Available_List
        [ ] = {
            CODEX_G723(3)         // CODEC provided by MG3
        }
    }
}
```

It should be noted that a Termination_Type of G.723 has been requested by selecting the CODEC device on MG3 108.

Similarly, the following PST, CPD and CPRD should represent the current state of this call within MG1 104.

```
PathSearchTable {...,'Tr(3,10)'=038, ...};
CPD[038]
{
    Connection_ID = "C1";
    InterTrunk_Port_List [ ] =
    { "Tr(3,10)"=2033 };
}
CPRD[2033]
{
    CPD_Index = 038;
    Port_Identifier = "Tr(3,10)";
    Upstream Coding = G723;      // Upstream coding changed
                                    to G.723
    Downstream Coding = G723;
    TermReached = True;
    UpstreamResource[ ] = {
    CODEX_G723(3),               // CODEC provided by MG3
    };
    LocalResource[ ] = { };
}
```

When MG2 106 receives resource selection message 142 it updates its local internal database to remove the unused resources from the local reservations for both paths and the resources reserved in the upstream MG nodes (in this exemplary embodiment MG3 108). MG2 106 may then send the following resource select message 144 to MG3 108.

```
Class= Resource Control,
Construct= Resource Select
Resource Selection
{
    Port_Identifier = "Tr(17,20)";
    Termination_Type= G723;       // MG3 Traffic changed
                                     to G.723
    Resources_List
    {
        Resource Count = 1;        // selecting one resource
        Resources_Available_List [ ] = {
            CODEX_G723(1);
            // CODEC to be provided by
            MG3 - chip index decremented
        }
    }
}
```

Note that the chip index has been decremented to reflect the index used by MG3 108 and that the traffic type reflects a conversion from G.711 to G.723 on MG3 108.

Similarly, the following PST, CPD and CPRD should represent the current state of this call within MG2 106.

```
PathSearchTable {...,'Tr(3,10)'=0340, 'Tr(17,20)'=0340...};
CPD[0340]
{
    Connection_ID = "C3";
    InterTrunk_Port_List [ ] = { "Tr(3,10)"= 1233,
    "Tr(17,20)"=3345 };
}
CPRD[1233]
{
    CPD_Index = 0340;
    Port_Identifier = "Tr(3,10)";
    Upstream Coding = G723;
    Downstream Coding = G723;
    TermReached = True;
    UpstreamResource[ ] = { };
    LocalResource[ ] = { };        //local resources removed
}
CPRD[3345]
```

-continued

```
{
    CPD_Index = 0340
    Port_Identifier = "Tr(17,20)"
    Upstream_Coding = G723;        // traffic type changed to G.723
    Downstream_Coding = G723;
    TermReached = True
    UpstreamResource[ ] = {
        CODEX_G723(3)              //resource selected on MG3
    };
    LocalResources[ ]= { HEC(1) };        //resources still reserved for MG3
}
```

The Upstream_Coding field has been changed to indicate G.723 encoding coming from MG3 108 and local resources for call processing in the direction of MG1 104 have been removed from the reservation list. The resources for call processing in the direction of MG3 108 may still be reserved.

In this exemplary embodiment, MG3 108 may make its own decision about resource allocation prior to receiving resource select message 144. MG3 108 processes available resources to establish call context C2 which indicates a conversion of incoming G.723 traffic to G.711. MG3 108 may use it own G.723 to G.711 converter, and its own HEC, ALC, and ANR (all provided with one device), or it may request some of these services from other MGs. Currently, the only available upstream resource is the HEC from MG2 106. Because MG3 108 is a terminating node and has G.723 to G.711 conversion and a bi-directional HEC it may choose to perform all operations locally. By choosing local conversion for all call context C2 requirements, MG3 108 may limit external device usage and may keep the conversions at a terminating node. MG3 108 may choose to convert the traffic seen by MG2 106 and may send the following resource select message 146.

```
Class= Resource Control,
Construct= Resource Selection
Resource Selection
{
    Port_Identifier = Tr(17,20),
    Termination Type= G723,       // change traffic type from G.711
    Resources List
    {
        Resource Count = 0,       // none selected
    }
}
```

Similarly, the following PST, CPD and CPRD should represent the current state of this call within MG3 108.

```
PathSearchTable {...,'Tr(17,20)'=123, ...};
CPD[123]
{
    Connection_ID = "C2";
    InterTrunk_Port_List []= { "Tr(17,20)"= 45 };
}
CPRD[45]
{
    CPD_Index = 123;
    Port_Identifier = "Tr(17,20)";
    Upstream Coding = G711;
    Downstream Coding = G723;     //Traffic type changed to G.723
    TermReached = True;
    UpstreamResource[] = { };     // upstream resources removed
    LocalResource[]=
```

-continued

```
    {
        HEC(1), ALC(1), ANR(1), CODEX_G723(1) //Local resources selected
    }
}
```

It should be noted that the traffic type has been changed to G.723 for call context C2 and that local resources that have not been used to process the call have been released. Upstream resources have been removed as well because local resources are to be used for call processing.

Receipt of resource select message 144 by MG3 108 may now be considered. Upon receipt of resource select message 144, MG3 108 may remove unused upstream resources from its UpstreamResource field. MG3 108 may recognize that it has already made a resource allocation and removed the unused upstream resources. Accordingly, the following PST, CPD and CPRD should represent the current state of this call within MG3 108.

```
PathSearchTable {...,'Tr(17,20)'=123, ...};
CPD[123]
{
    Connection_ID = "C2";
    InterTrunk_Port_List []= { "Tr(17,20)"= 45 };
}
CPRD[45]
{
    CPD_Index = 123;
    Port_Identifier = "Tr(17,20)";
    Upstream Coding = G723;
    Downstream Coding = G723;
    TermReached = True;
    UpstreamResource[] = { };     //upstream resources removed
    LocalResource[]=
    {
        HEC(1), ALC(1), ANR(1), CODEX_G723(1)
    }
}
```

Upon receipt of resource select message 146 by MG2 106, local reserved resources may be removed from the reservation list and the following PST, CPD and CPRD should represent the current state of this call within MG2 106.

```
PathSearchTable {...;'Tr(3,10)'=0340, 'Tr(17,20)'=0340...};
CPD[0340]
{
    Connection_ID = "C3";
    InterTrunk_Port_List []= { "Tr(3,10)"= 1233, "Tr(17,20)"=3345 };
}
CPRD[1233]
{
    CPD_Index = 0340;
    Port_Identifier = "Tr(3,10)";
    Upstream Coding = G723;
    Downstream Coding = G723;
    TermReached = True;
    UpstreamResource[] = { };
    LocalResource[] = { };
}
CPRD[3345]
{
    CPD_Index = 0340
    Port_Identifier = "Tr(17,20)"
    Upstream_Coding = G723 ;
    Downstream_Coding = G723 ;
    TermReached = True
    Upstream Resource[] = {
        CODEX_G723(3)
    };
    LocalResources[]= { };           //local resources removed
}
```

Because no other changes are needed for MG1 104 to process the call the resource selection phase may be considered completed and no resource select message needs to be sent by MG2 106 to MG1 104. Accordingly, at this point all resources to process the call have been allocated by the MGs independent of intervention by MGC 102. MGC 102 was not involved in the resource allocation. This approach of hiding the internal resources of a distributed MG cluster may simplify the design of MGCs and may allow an MGC soft switch to handle higher-level traffic related arrangements. This approach also may leave resource management to the MG cluster.

As an example of overhead associated with this exemplary embodiment, a typical MG cluster may be considered. For a typical MG cluster, each message may be encoded within approximately sixteen to twenty (16-20) bytes of data. Using this range as a model and a total message count of approximately eight (8) messages for each connection, a total data size of one hundred and twenty eight to one hundred and sixty (128-160) bytes of data may be used per connection. This may correlate for a'heavily loaded system to, with an exemplary 3 million calls/hour, a total of (160*3M)/3600, or about 140K bytes per second which is equivalent to a bandwidth of approximately one T1 facility. It should be noted that any suitable communication path may be used for resource allocation between MGs in a cluster. For example, voice trunks or an Ethernet separate from the voice trunks may be used for resource allocation messaging.

Figure 2:
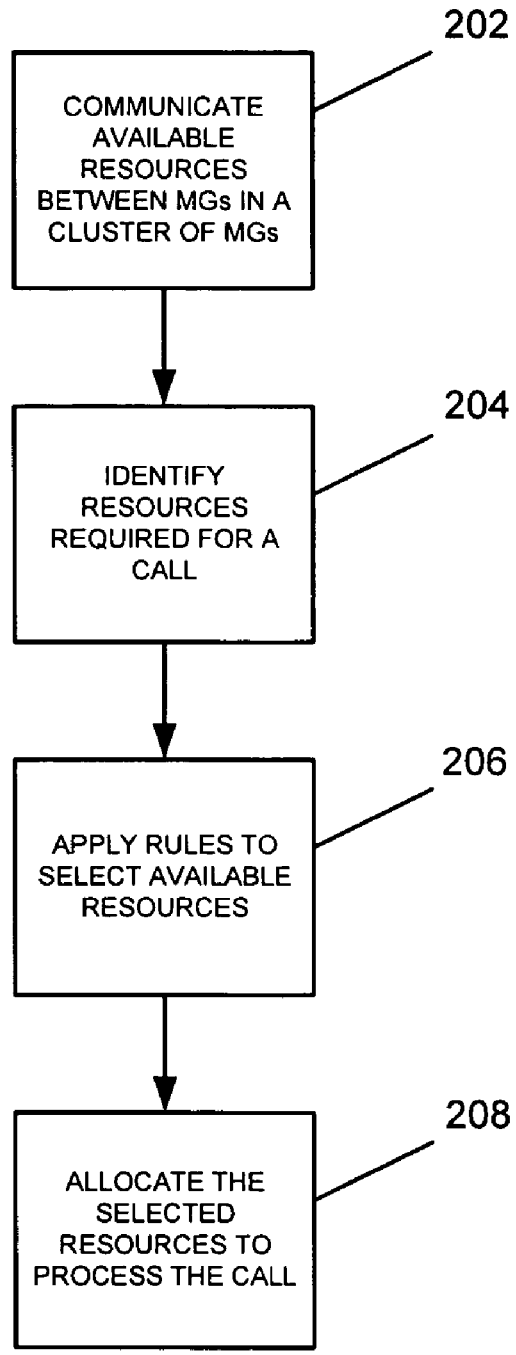
FIG. 2 is flow chart illustrating an exemplary resource allocation process according to an embodiment of the subject matter described herein.

FIG. 2 shows an exemplary clustered resource allocation process 200 wherein a cluster of MGs may allocate resources in a distributed fashion by communicating available resources between MGs in the cluster. At block 202, a cluster of MGs under control of a MGC may communicate available resources between them. At block 204, resources needed for a call may be identified. At block 206, rules may be applied to select resources from the available resources. At block 208, selected resources may be allocated to process the call.

Figure 3:
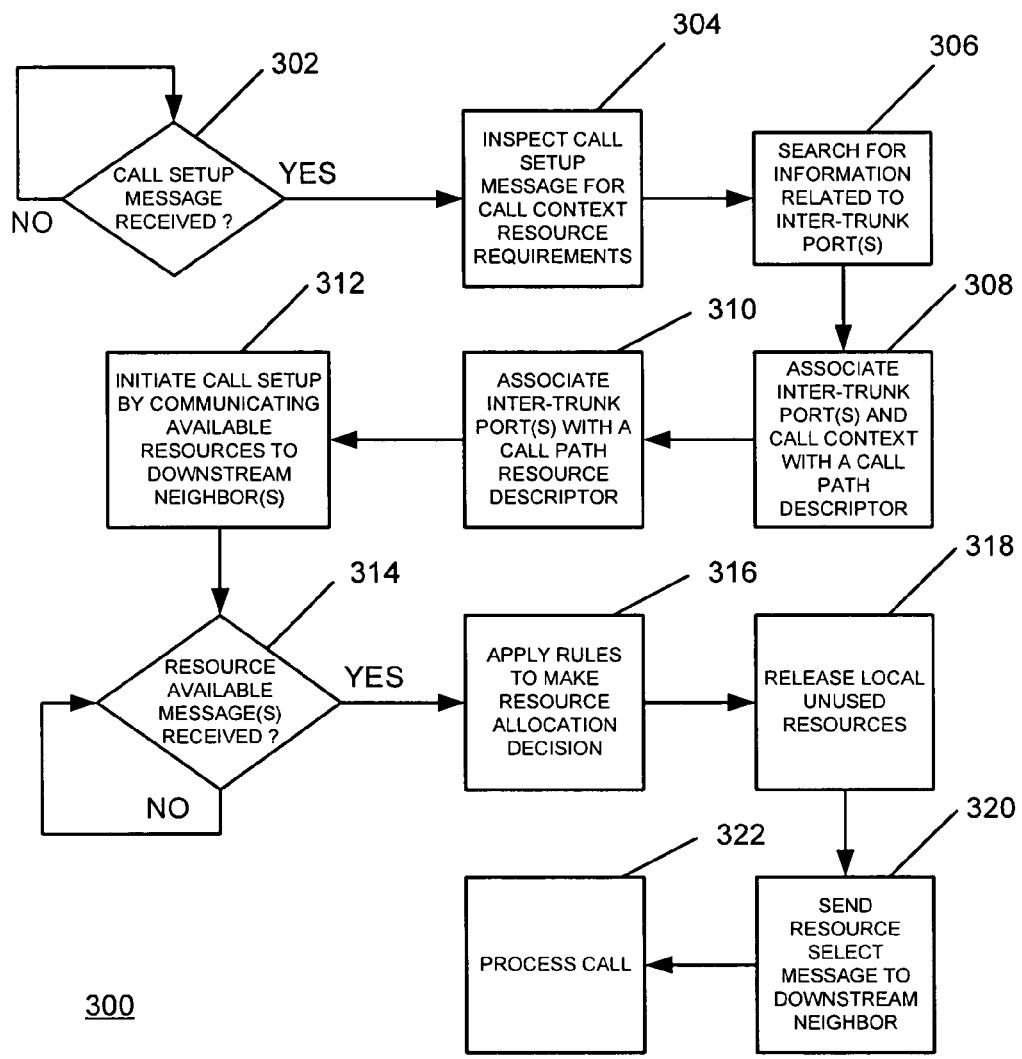
FIG. 3 is a flow chart illustrating an exemplary resource allocation process wherein a call setup message is received at a media gateway before a resource available message according to an embodiment of the subject matter described herein.

FIG. 3 shows an exemplary clustered resource allocation process 300 wherein consideration may be given to a situation whereby a call setup message gets received at an MG node prior to receipt of a resource available message. As discussed previously in relation to other embodiments, a call setup message may not be the first message received by an MG in an MG cluster because of the asynchronous nature of the messages. The situation where a call setup message may be received asynchronous after a resource available message will be discussed in another embodiment below.

At decision point 302, clustered resource allocation process 300 may wait for a call setup message to be received. When a call setup message is received at decision point 302, processing may move to block 304 to inspect the call setup message for call context resource requirements. At block 306, the MG may search for information related to the inter-trunk port, or ports, represented in the call setup message.

As discussed above in relation to exemplary data structures that may be used within a given MG, exemplary clustered resource allocation process 300 may associate the inter-trunk port, or ports, and call context with a CPD at block 308. At block 310, the MG may associate the inter-trunk port, or ports, with a CPRD.

At block 312, the MG may initiate call setup without assistance from MGC 102 by communicating available local resources to its downstream neighbor or neighbors. As discussed above, an MG that receives a call setup message may be a terminating MG node or an MG node residing in the middle of the cluster of MGs. Accordingly, when the MG is a terminating node, only one resource available message may need to be sent. Conversely, for an MG that resides in the middle of a call path in a cluster of MGs, a resource available message may need to be sent to a downstream MG in each direction along the call path, as discussed in more detail above.

At decision point 314, clustered resource allocation process 300 may wait for a resource available message, or messages, to be received from an upstream node, along the call path. Again, for a terminating MG, only one resource available message may be received with a TermReached boolean set to true, whereas, for an MG node in the middle of an MG cluster along a call path, more than one resource available message may be received with a TermReached boolean set to true from MG nodes that are upstream from the present MG node in opposite call directions. For simplicity, the remainder of the discussion of clustered resource allocation process 300 may continue by discussion of a single thread of action associated with a single resource available message receipt at decision point 314. It should be understood that the following discussion may apply to each resource available message received by an MG.

When a resource available message, with a TermReached boolean set to true, is received at decision point 314, clustered resource allocation process 300 may apply rules to make resource allocation decisions at block 316. Rules applied at block 316 may include any of those discussed above in relation to previous embodiments. Once a resource allocation decision has been made at block 316, unused upstream resources may be released at block 318 for the upstream call direction. At block 320, clustered resource allocation process 300 may send a resource select message to its downstream neighbor that is logically selecting resources for the upstream call path associated with the given direction along the call path. At block 322 call processing may begin. If a resource select message is received from the downstream neighbor, all unused locally reserved resources may be released at block 322.

Figure 4:
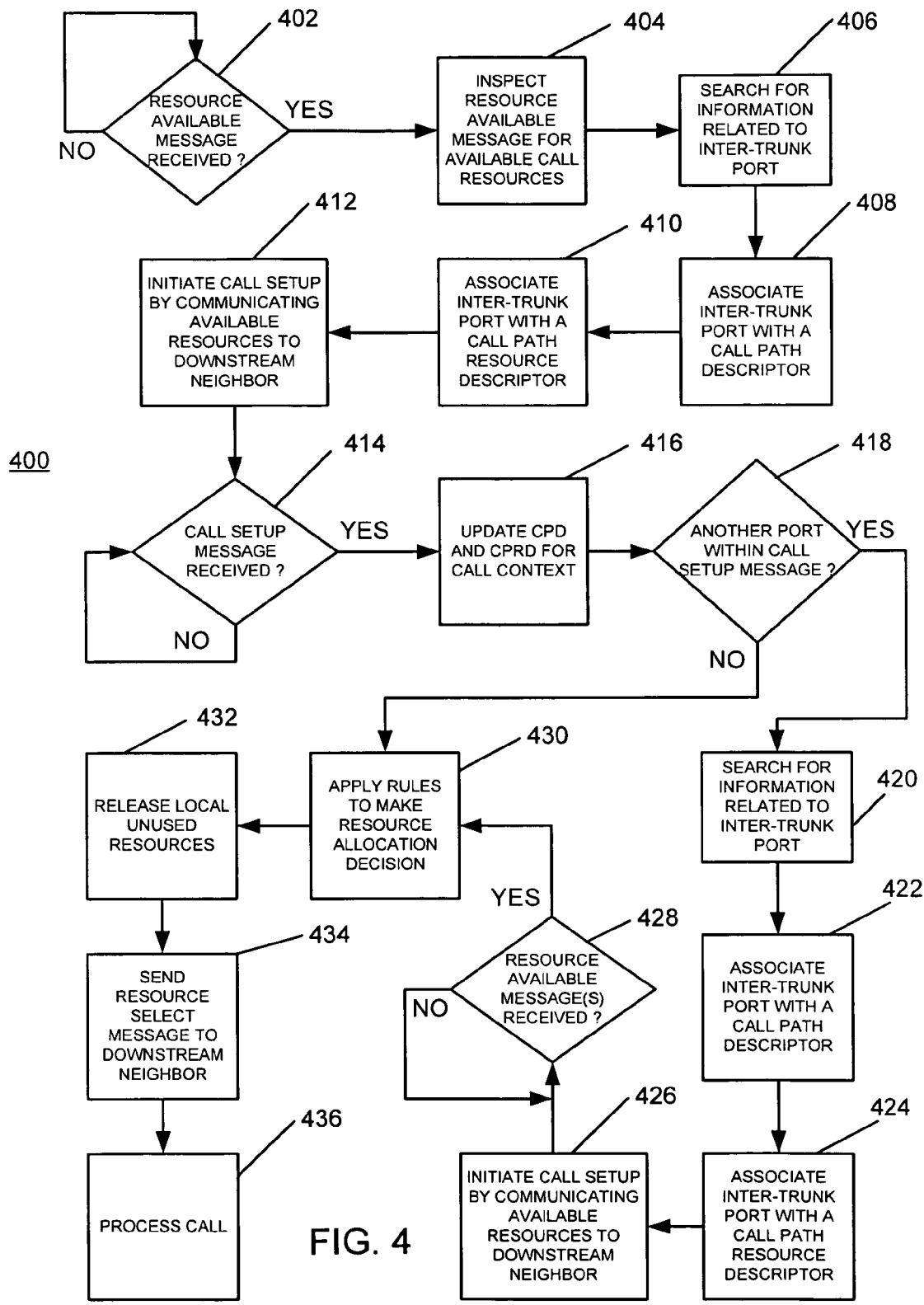
FIG. 4 is a flow chart illustrating an exemplary resource allocation process wherein a resource available message is received at a media gateway before call setup a message according to an embodiment of the subject matter described herein.

FIG. 4 shows an exemplary clustered resource allocation process 400. In clustered resource allocation process 400, consideration may now be given to a situation wherein a resource available message may be received prior to receipt of a call setup message at an MG node. At decision point 402, clustered resource allocation process 400 may wait for either a call setup message or a resource available message to be received. Again, in this embodiment, decision point 402 may be considered as a decision point waiting for receipt of a resource available message. When a resource available message has been received at decision point 402, clustered resource allocation process 400 may inspect the resource available message for upstream call resource availability at block 404.

At block 406, clustered resource allocation process 400 may search for information related to an inter-trunk port identified within the resource available message. At block 408, the inter-trunk port may be associated with a CPD. The inter-trunk port may further be associated with a CPRD at block 410. At block 410, any upstream resources identified in the received resource available message may also be associated with the inter-trunk port in the call path resource descriptor.

At decision point 412, clustered resource allocation process 400 may wait for a call setup message to be received. When a call setup message is received, the previously created CPD and CPRD for the call context may be updated at block 414. As previously discussed, a call setup message may include either one or two inter-trunk port descriptors for a call context depending upon whether the receiving MG is a terminating or non-terminating MG node, respectively. In the case of a non-terminating node, an additional port may be specified within the call setup message for the call context. At decision point 416, a determination can be made as to whether an additional inter-trunk port has been specified within the call setup message. Recall that when there is an additional inter-trunk port identified within a call setup message, the receiving MG node may reside in the middle of the cluster of MG nodes. In this instance, a CPRD for the call direction associated with the previously received resource available message may have already been created or updated above. However, a CPRD for the new port may still need to be created or updated.

When there is a second inter-trunk port within the call setup message as determined at decision point 416, clustered resource allocation process 400 may search for information related to the new inter-trunk port at block 418. At block 420, the new inter-trunk port may be associated with a CPD, and at block 422, the new inter-trunk port may be associated with a CPRD.

As discussed above, for a situation where two resource available messages have been received prior to the call setup message there may be two previously instantiated CPD/CPRD pairs and a merge operation may also be performed. In the present embodiment, consideration may be given to a second resource available message received after the call setup message.

At block 424, clustered resource allocation process 400 may initiate call setup by communicating available resources to a downstream neighbor. As discussed above, both local and upstream resources may be communicated to the downstream neighbor.

Call setup may also be initiated at block 424 when, as determined at decision point 416, there is not a second inter-trunk port within the call setup message. When only one inter-trunk port was specified in the call setup message received, clustered resource allocation process 400 may recognize that it is terminating node and, as discussed above, only local resources may be communicated to the downstream neighbor.

In either case, clustered resource allocation process 400 may wait to receive a resource available message associated with the new inter-trunk port with a TermReached boolean set to true at decision point 426. Once the TermReached Boolean set to true for this inter-trunk port is received, clustered resource allocation process 400 may apply rules to make resource allocation decisions at block 428, as previously discussed above.

Once a resource allocation decision has been made at block 428, clustered resource allocation process 400 may send a resource select message to its downstream neighbor (logical upstream neighbor) that is associated with the given direction along the call path at block 430. At decision point 432, clustered resource allocation process 400 may determine whether a resource select message has been received from a downstream neighbor. If a resource select message has been received, call processing may begin at block 434, and clustered resource allocation process 400 may again determine whether a resource select message has been received from a downstream neighbor. Call processing may continue and when a resource select message is received at decision point 432, any unused local resources may be released at block 436 and call processing may continue until completed at block 438.

Figure 5:
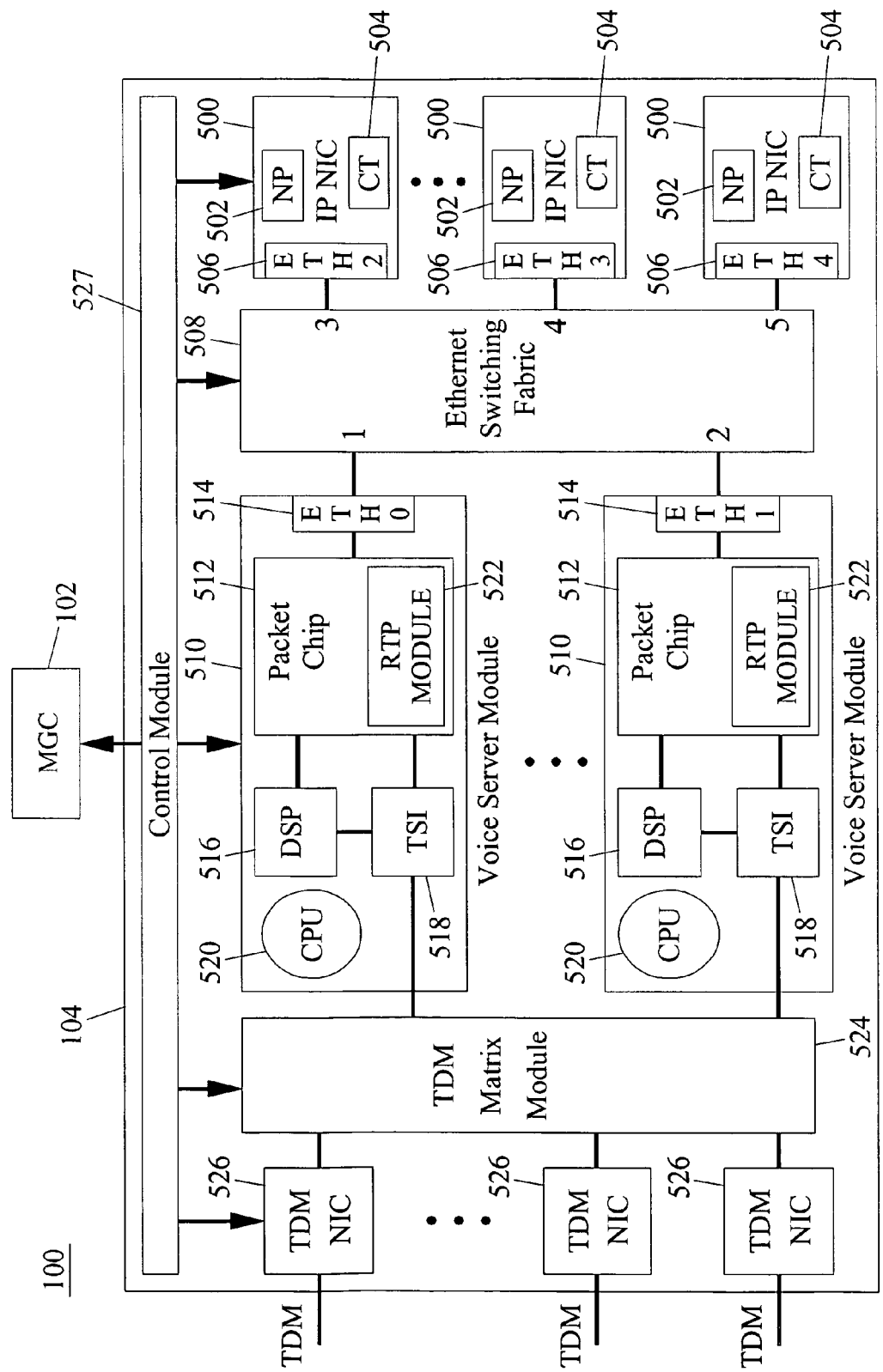
FIG. 5 is a block diagram of a media gateway (MG) including an Ethernet switching fabric for implementing resource allocation among clustered media gateways in a communications network according to an embodiment of the subject matter described herein.

FIG. 5 is a block diagram illustrating an exemplary internal architecture for MG 104 according to an embodiment of the subject matter described herein. In the illustrated example, media gateway 104 includes a plurality of network interfaces 500 that may send and receive packets from external devices. Each network interface 500 includes a network processor 502, a connection table 504, and an internal Ethernet interface 506. Network processors 502 perform packet forwarding functions based on data stored in connection tables 504. Connection tables 504 store connection identifiers for forwarding incoming and outgoing packets to and from each network interface 500. Internal Ethernet interfaces 506 connect each network interface 500 to an Ethernet switching fabric 508.

Ethernet switching fabric 508 switches Ethernet frames between network interfaces 500 and voice servers 510. Each voice server 510 includes a packet chip 512, an internal Ethernet interface 514, a digital signal processor (DSP) 516, a time slot interconnect (TSI) 518 and a central processing unit (CPU) 520. Packet chips 510 process incoming media packets for voice over IP and voice over ATM connections and formulate outgoing media packets for voice over IP and voice over ATM connections. In one implementation, each packet chip 510 may include an RTP module 522 for implementing real-time transmission protocol functions. Internal Ethernet interfaces 514 connect each voice server 510 to Ethernet switching fabric 508. DSP 516 may perform voice processing functions, such as those discussed above in relation to the call contexts and resources for processing calls. Time slot interconnect 518 switches voice channels for calls received via TDM matrix module 524. CPU 520 controls the overall operation of each voice server module.

TDM matrix module 524 forwards TDM channels between TDM network interface cards 526 and voice servers 510. Each TDM network interface 526 may interface with one or more TDM channels. A control module 527 controls the overall operation of media gateway 104. Media gateway controller 102 may perform the call setup messaging discussed above. Resource allocation is performed by control module 527. Resources that are being allocated are provided by voice server modules, such as DSP 516, as discussed above.

Figure 6:
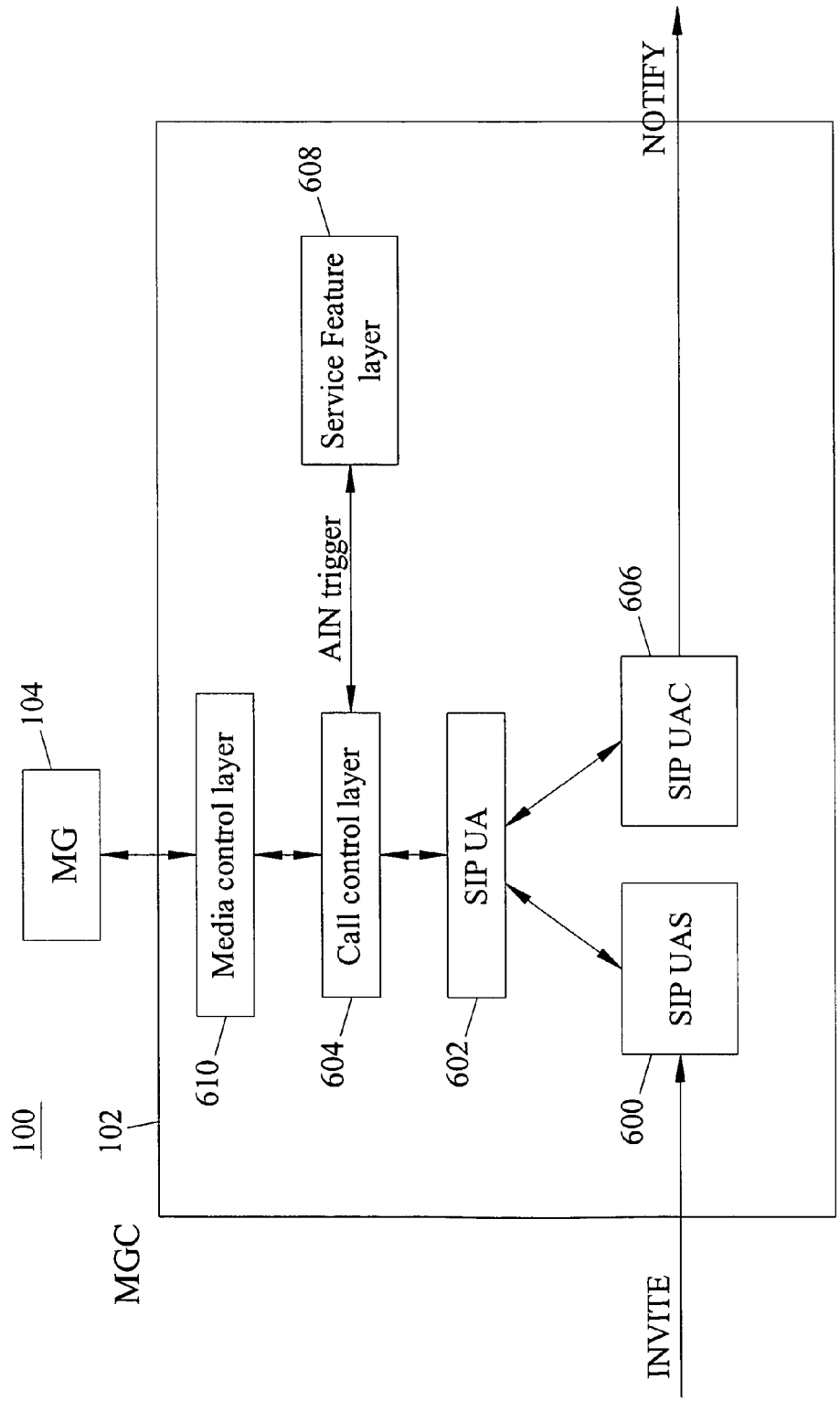
FIG. 6 is a block diagram of a media gateway controller (MGC) for implementing resource allocation among clustered media gateways in a communications network according to an embodiment of the subject matter described herein.

FIG. 6 is a block diagram illustrating an exemplary internal architecture of MGC 102 from a session initiation protocol (SIP) perspective. It should be understood that any protocol capable of communicating call information, such as ISDN or any other packet-based protocol, may be substituted for SIP in FIG. 6.

Referring to FIG. 6, MGC 102 includes a SIP user agent server 600 for receiving, parsing, and validating SIP request messages, such as Invite messages. SIP user agent server 600 may also send responses for request messages. Once a request message has been validated, SIP user agent server 600 may send the SIP request message to SIP user agent 602 for further action or processing.

SIP user agent 602 may convert SIP messages into a single or multiple internal messages that can be acted on by MGC components. SIP user agent 602 may also route internal messages to the appropriate components of MGC 102 for action. For example, in the case of a new call, a call setup message may be sent to call control layer 604 to establish a new call leg. SiP user agent 602 may also send action results from MGC components to either SIP user agent server 600 or a SIP user agent client 606, depending on whether a message is a new request or a response to an existing SIP request message. SIP user agent client 606 may, based on instructions from SIP user agent 602, compose an outbound SIP request message and send it to the destination specified in the SIP message header.

Call control layer 604 may process call setup messages received from SIP user agent 602. In processing the call setup messages, call control layer 604 may determine if a called party is currently engaged in a call with another called party. In performing call waiting functions, call control layer 604 may interact with service feature layer 608 to determine whether call waiting can be applied to the called party. The interaction between call control layer 604 and service feature layer 608 may occur via advanced intelligent network (AIN) triggers, queries, and responses. Call control layer 604 may also generate a call waiting request to SIP user agent 602. Call control layer 604 may interact with a media control layer 610 to instruct a controlled media gateway to provide connection resources for call setup.

Media control layer 610 interacts with media gateways via standard media gateway control protocols, such as H.248/MEGACO to communicate physical resource allocation as needed by call control layer 604 or service feature layer 608.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for distributed resource allocation between media gateways (MGs) in a cluster of MGs, the method comprising:
   (a) communicating, between media gateways (MGs) in a cluster of MGs controlled by a media gateway controller (MGC), available resources provided by each of the MGs; and
   (b) at the MGs:
      identifying resources required for a call involving one or more of the MGs and for which call setup messages are received from the MGC;
      (ii) applying rules to select resources for the call from the available resources; and
      (iii) allocating the selected resources to process the call, wherein allocating the selected resources to process the call does not involve the MGC, wherein when a first MG of the cluster of MGs identifies a second MG of the cluster of MGs to provide a codec conversion needed for the call, the first MG sends a message to the second MG to request that the second MG provide the codec conversion.

2. The method of claim 1 wherein communicating available resources includes communicating the available resources in response to a call setup message from the MGC.

3. The method of claim 2 wherein the call setup message identifies a call context.

4. The method of claim 3 wherein the call context identifies a pair of port identifiers for connecting the call and conversion characteristics for the call.

5. The method of claim 4 wherein the conversion characteristics include at least one of hybrid echo cancellation (HEC), automatic level control (ALC), automatic level enhancement (ALE), automatic noise reduction (ANR), an international telecommunication union (ITU) series G coder/decoder (CODEC) conversion standard, and a voice over IP (VoIP) conversion standard.

6. The method of claim 3 wherein identifying resources required for the call includes comparing the call context with the available resources.

7. The method of claim 1 wherein communicating available resources includes communicating an inter-trunk port identifier associated with the call.

8. The method of claim 1 wherein communicating available resources includes communicating available local resources to a downstream MG within the cluster.

9. The method of claim 1 wherein communicating available resources includes communicating available resources on an upstream MG to a downstream MG within the cluster.

10. The method of claim 1 wherein the available resources include at least one of a resource for hybrid echo cancellation (HEC), a resource for automatic level control (ALC), a resource for automatic noise reduction (ANR), a resource for automatic level enhancement (ALE), a resource for packet voice tunneling including at least one of transaction free operation (TFO) and transcoder free operation (TrFO) through the cluster of MGs, a resource for coder/decoder (CODEC) conversion, a resource to manage music-on-hold broadcasting within a cluster, a resource to manage cellular text modem/teletype (CTM/TTY) insertion, and no resource.

11. The method of claim 1 wherein applying rules to select resources includes applying at least one of:
(a) a rule to minimize a number of converting devices in a call path;
(b) a rule to attempt to consolidate converting devices on one MG;
(c) a rule to prefer converting devices closer to a terminating port over converting devices farther from the terminating port;
(d) a rule that terminating ports decide which of the available resources are to be used; and
(e) a rule to allow a terminating MG to override a resource selection made by an inter-connecting MG wherein the inter-connecting MG may have selected a locally available resource to modify a pulse code modulated (PCM) stream.

12. The method of claim 1 wherein allocating the selected resources includes selecting, from an MG within the cluster, a resource associated with an MG upstream from the MG within the cluster.

13. The method of claim 1 wherein allocating the selected resources includes sending a resource control message from an MG to a neighboring MG within the cluster.

14. The method of claim 13 wherein the resource control message includes an upstream termination type associated with the call.

15. The method of claim 14 wherein the termination type includes at least one of an international telecommunication union (ITU) series G coder/decoder (CODEC) conversion standard and a Voice over IP (VoIP) conversion standard.

16. The method of claim 15 wherein the ITU series G CODEC conversion standard includes at least one of G.711 and G.723.

17. The method of claim 13 wherein the resource control message includes at least one device identifier to identify at least one of the available resources.

18. The method of claim 1 wherein communicating available resources includes sending a resource available message from an MG to a downstream MG within the cluster.

19. The method of claim 1 wherein allocating the selected resources includes sending a resource select message from an MG to an upstream MG within the cluster.

20. A system for distributed resource allocation between media gateways (MGs) in a cluster of MGs, the system comprising:
(a) a media gateway controller (MGC); and
(b) a plurality of media gateways (MGs) controlled by the MGC and forming a cluster of MGs, wherein the MGs are adapted to:
(i) communicate, between the MGs in the cluster, available resources provided by each of the MGs;
(ii) identify resources required for a call involving one of more of the MGs and for which call setup messages are received from the MGC;
(iii) apply rules to select resources for the call from the available resources; and
(iv) allocate the selected resources to process the call, wherein the MGs do not involve the MGC when allocating the selected resources to process the call, wherein if a first MG of the cluster of MGs identifies a second MG of the cluster of MGs to provide a codec conversion needed for the call the first MG sends a message to the second MG to request that the second MG provide the codec conversion.

21. The system of claim 20 wherein the MGs are adapted to communicate the available resources provided by the MGs between the MGs in response to the call setup messages from the MGC.

22. The system of claim 21 wherein each of the call setup messages identifies a call context.

23. The system of claim 22 wherein each call context identifies a pair of port identifiers for connecting the call and conversion characteristics for the call.

24. The system of claim 23 wherein the conversion characteristics include at least one of hybrid echo cancellation (HEC), automatic level control (ALC), automatic level enhancement (ALE), automatic noise reduction (ANR), an international telecommunication union (ITU) series G coder/decoder (CODEC) conversion standard, and a voice over IP (VoIP) conversion standard.

25. The system of claim 22 wherein, in identifying resources required for the call, the MGs are adapted to compare the call context with the available resources.

26. The system of claim 20 wherein, in communicating available resources, the MGs are adapted to exchange an inter-trunk port identifier associated with the call.

27. The system of claim 20 wherein, in communicating available resources, an MG is adapted to communicate available local resources to a downstream MG within the cluster.

28. The system of claim 20 wherein, in communicating available resources, an MG within the cluster is adapted to communicate available resources on an upstream MG to a downstream MG within the cluster.

29. The system of claim 20 wherein the available resources include at least one of a resource for hybrid echo cancellation (HEC), a resource for automatic level control (ALC), a resource for automatic noise reduction (ANR), a resource for automatic level enhancement (ALE), a resource for packet voice tunneling including at least one of transaction free operation (TFO) and transcoder free operation (TrFO) through the cluster of MGs, a resource for coder/decoder (CODEC) conversion, a resource to manage music-on-hold broadcasting within a cluster, a resource to manage cellular text modem/teletype (CTM/TTY) insertion, and no resource.

30. The system of claim 20 wherein, in applying rules to select resources from the available resources, the MGs are adapted to apply at least one of:
(a) a rule to minimize a number of converting devices in a call path;
(b) a rule to attempt to consolidate converting devices on one MG;
(c) a rule to prefer converting devices closer to a terminating port over converting devices farther from the terminating port;
(d) a rule that terminating ports decide which of the available resources are to be used; and
(e) a rule to allow a terminating MG to override a resource selection made by an inter-connecting MG wherein the inter-connecting MG may have selected a locally available resource to modify a pulse code modulated (PCM) stream.

31. The system of claim 20 wherein, in allocating the selected resources, an MG within the cluster is adapted to select a resource associated with an MG upstream from the MG within the cluster.

32. The system of claim 20 wherein, in allocating the selected resources, an MG is adapted to send a resource control message to a neighboring MG within the cluster.

33. The system of claim 32 wherein the resource control message includes an upstream termination type associated with the call.

34. The system of claim 33 wherein the termination type includes at least one of an International Telecommunication Union (ITU) series G coder/decoder (CODEC) conversion standard and a Voice over IP (VoIP) conversion standard.

35. The system of claim 34 wherein the ITU series G CODEC conversion standard includes at least one of G.711 and G.723.

36. The system of claim 32 wherein the resource control message includes at least one device identifier to identify at least one of the available resources.

37. The system of claim 20 wherein, in communicating available resources, an MG is adapted to send a resource available message to a downstream MG within the cluster.

38. The system of claim 20 wherein, in allocating the selected resources, an MG is adapted to send a resource select message to an upstream MG within the cluster.

39. A computer program product comprising computer-executable instructions embodied in a computer readable medium for performing steps comprising:
(a) communicating, between media gateways (MGs) in a cluster of MGs controlled by a media gateway controller (MGC), available resources provided by each of the MGs; and
(b) at the MGs:
(i) identifying resources required for a call involving one or more of the MGs and for which call setup messages are received from the MGC;
(ii) applying rules to select resources for the call from the available resources; and
(iii) allocating the selected resources to process the call, wherein allocating the selected resources to process the call does not involve the MGC, wherein if a first MG of the cluster of MGs identifies a second MG of the cluster of MGs to provide a codec conversion needed for the call the first MG sends a message to the second MG to request that the second MG provide the codec conversion.

\* \* \* \* \*